US012793699B2

(12) United States Patent
Nguyen et al.

(10) Patent No.: US 12,793,699 B2
(45) Date of Patent: Nov. 10, 2026

(54) SYNTHESIZING MULTI-ACCENT SPEECH USING ADAPTIVE WEIGHTS

(71) Applicant: Zoom Video Communications, Inc., San Jose, CA (US)

(72) Inventors: Tuan Nam Nguyen, Karlsruhe (DE); Alexander Waibel, Sammamish, WA (US)

(73) Assignee: Zoom Communications, Inc., San Jose, CA (US)

( * ) Notice: Subject to any disclaimer, the term of this patent is extended or adjusted under 35 U.S.C. 154(b) by 176 days.

(21) Appl. No.: 18/205,287

(22) Filed: Jun. 2, 2023

(65) Prior Publication Data

US 2024/0404505 A1 Dec. 5, 2024

(51) Int. Cl.

*G10L 13/047* (2013.01)
*G06N 3/045* (2023.01)
*G06N 3/096* (2023.01)

(52) U.S. Cl.

CPC ............ *G10L 13/047* (2013.01); *G06N 3/045* (2023.01); *G06N 3/096* (2023.01)

(58) Field of Classification Search

CPC ..... G10L 13/047; G10L 13/033; G10L 13/10; G10L 13/08; G06N 3/045; G06N 3/096; G06N 3/0455; G06N 3/0475; G06N 3/094

See application file for complete search history.

(56) References Cited

U.S. PATENT DOCUMENTS

| | | | | |
|---|---|---|---|---|
| 11,049,308 | B2 * | 6/2021 | del Val Santos | G06N 3/088 |
| 11,134,217 | B1 | 9/2021 | Goel | |
| 12,375,624 | B2 | 7/2025 | Nguyen et al. | |
| 2011/0282669 | A1 | 11/2011 | Michaelis | |
| 2021/0271980 | A1 * | 9/2021 | Polykovskiy | G06N 3/088 |
| 2022/0122579 | A1 | 4/2022 | Biadsy et al. | |
| 2022/0358903 | A1 | 11/2022 | Serebryakov et al. | |
| 2022/0415340 | A1 | 12/2022 | Barhate et al. | |
| 2024/0355346 | A1 | 10/2024 | Lubin et al. | |

OTHER PUBLICATIONS

Melechovsky et al, Learning Accent Representation with Multi-level VAE Towards Controllable Speech Synthesis, 2022 IEEE Spoken Language Technology Workshop (SLT), Jan. 9, 2023, pp. 928-935 (Year: 2023).*

(Continued)

*Primary Examiner* — Linda Wong

(74) *Attorney, Agent, or Firm* — Kilpatrick Townsend & Stockton LLP

(57) ABSTRACT

Techniques for synthesizing multi-accent speech using adaptive weights are provided. A computing system may receive a text input along with first information about a first accent. The computing system may access a first trained machine learning model, the first trained machine learning model trained to synthesize, from inputted text, waveforms representing speech. The computing device may apply one or more adaptive weights to the first trained machine learning model, the one or more adaptive weights characterizing the first accent. The computing device may then synthesize, using the first trained machine learning model with the applied one or more adaptive weights, a first waveform representing the text input, wherein the first waveform is characterized by the first accent.

20 Claims, 11 Drawing Sheets

(56) References Cited

OTHER PUBLICATIONS

Pham et al, Efficient Weight Factorization for Multilingual Speech Recognition, Interspeech 2021, Jan. 1, 2021, pp. 2421-2425 (Year: 2021).*
Chen et al, MultiSpeech: Multi-Speaker text to speech with transformer, https://arxiv.org/abs/2006.04664, Aug. 1, 2020 (Year: 2020).*
Weng, Flow based Deep Generative Models, https://lilianweng.github.io/posts/2018-10-13-flow-models/, Oct. 13, 2018 (Year: 2018).*
Pre-trained Text Embeddings for Enhanced Text-to-Speech Synthesis, Interspeech 2019, Sept 15-19, 2019, pp. 4430-4434 (Year: 2019).*
Eloff et al, Unsupervised acoustic unit discovery for speech synthesis using discrete latent-variable neural networks, https://arxiv.org/pdf/1904.07556, Jun. 28, 2019 (Year: 2019).*
EP International Search Report and Written Opinion for PCT/US2024/028469 mailed Aug. 26, 2024.
Pham et al., "Efficient Weight Factorization For Multilingual Speech Recognition", Interspeech 2021, Jan. 1, 2021; pp. 2421-2425.
Nguyen et al., "SYNTACC: Synthesizing Multi-Accent Speech By Weight Factorization", ICASSP 2023, IEEE, Jun. 4, 2023; pp. 1-5.
Melechovsky et al., "Learning Accent Representation with Multi-Level VAE Towards Controllable Speech Synthesis", 2022 IEEE Spoken Language Technology Workshop (SLT), IEEE, Jan. 9, 2023; pp. 928-935.
Kumar et al., "Learning Robust Latent Representations For Controllable Speech Synthesis", arxiv.org, Cornell Univ. Library, May 10, 2021; pp. 1-14.
Li et al., "Neural Speech Synthesis With Transformer Network", AAAI Conference on Artificial Intelligence, Sep. 1, 2018; pp. 6706-6713.
U.S. Appl. No. 18/102,916 , "Non-Final Office Action", Nov. 25, 2024, 10 pages.
"Github v0.2.1 released Aug. 31, 2021", Retrieved from internet on Jun. 2, 2023; https://github.com/coqui-ai/TTS/releases/tag/v0.2.1, Aug. 31, 2021, 2 pages.
Casanova, et al., "YourTTS: Towards Zero-Shot Multi-Speaker TTS and Zero-Shot Voice Conversion for everyone", Proceeding of the 39th International Conference on Machine Learning, Apr. 30, 2023, 9 pages.
Kim, et al., "Conditional Variational Autoencoder with Adversarial Learning for End-to-End Text-to-Speech", Proceedings of the 38th International Conference on Machine Learning, PMLR 139, 2021, Jun. 11, 2021, 15 pages.
Kim, et al., "Glow-TTS: A Generative Flow for Text-to-Speech via Monotonic Alignment Search", 34th Conference on Neural Information Processing Systems (NeurIPS 2020), Vancouver, Canada, Oct. 23, 2020, 14 pages.
Kolluru, et al., "Generating Multiple-accent pronunciations for TTS using joint sequence model interpolation", Proc. Interspeech 2014, 2014, 5 pages.
Kong, et al., "HiFi-GAN: Generative Adversarial Networks for Efficient and High Fidelity Speech Synthesis", 34th Conference on Neural Information Processing Systems (NeurIPS 2020), Vancouver, Canada, Oct. 23, 2020, 14 pages.
Nguyan, et al., "KIT's IWSLT 2021 Offline Speech Translation System", Proceedings of the 18th International Conference on Spoken Language Translation, Bangkok, Thailand, Aug. 2021, 6 pages.
Nguyen, et al., "Accent Conversion using Pre-trained Model and Synthesized Data from Voice Conversion", Interspeech 2022, Incheon, Korea, Sep. 2022, 5 pages.
Pham, et al., "Adaptive multilingual speech recognition with pretrained models", Proc. Interspeech 2022, May 24, 2022, 5 pages.
Pham, et al., "Efficient Weight factorization for Multilingual Speech Recognition", Proc. Interspeech 2021, May 7, 2021, 5 pages.
Pham, et al., "KIT's IWSLT 2020 SLT Translation System", Proceedings of the 17th International Conference on Spoken Language Translation, Online, Jul. 2020, 7 pages.
Ren, et al., "FastSpeech: Fast, Robust and Controllable Text to Speech", 33rd Conference on Neural Information Processing Systems (NeurIPS 2019), Vancouver, Canada, Nov. 20, 2019, 13 pages.
Vaswani, et al., "Attention is All you Need", 31st Conference on Neural Information Processing Systems (NIPS 2017), Long Beach, CA, USA, Dec. 6, 2017, 15 pages.
Zhao, et al., "L2-ARCTIC: A Non-Native English Speech Corpus", Proc. Interspeech 2018, 2018, 7 pages.
Unpublished pending U.S. Appl. No. 18/102,916, filed Jan. 30, 2023.
U.S. Appl. No. 18/102,916 , Notice of Allowance, Mailed On Apr. 7, 2025, 5 pages.

* cited by examiner

SYNTHESIZING MULTI-ACCENT SPEECH USING ADAPTIVE WEIGHTS

FIELD

The present application generally relates to text-to-speech synthesis, and more particularly relates to techniques for synthesizing multi-accent speech using adaptive weights.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
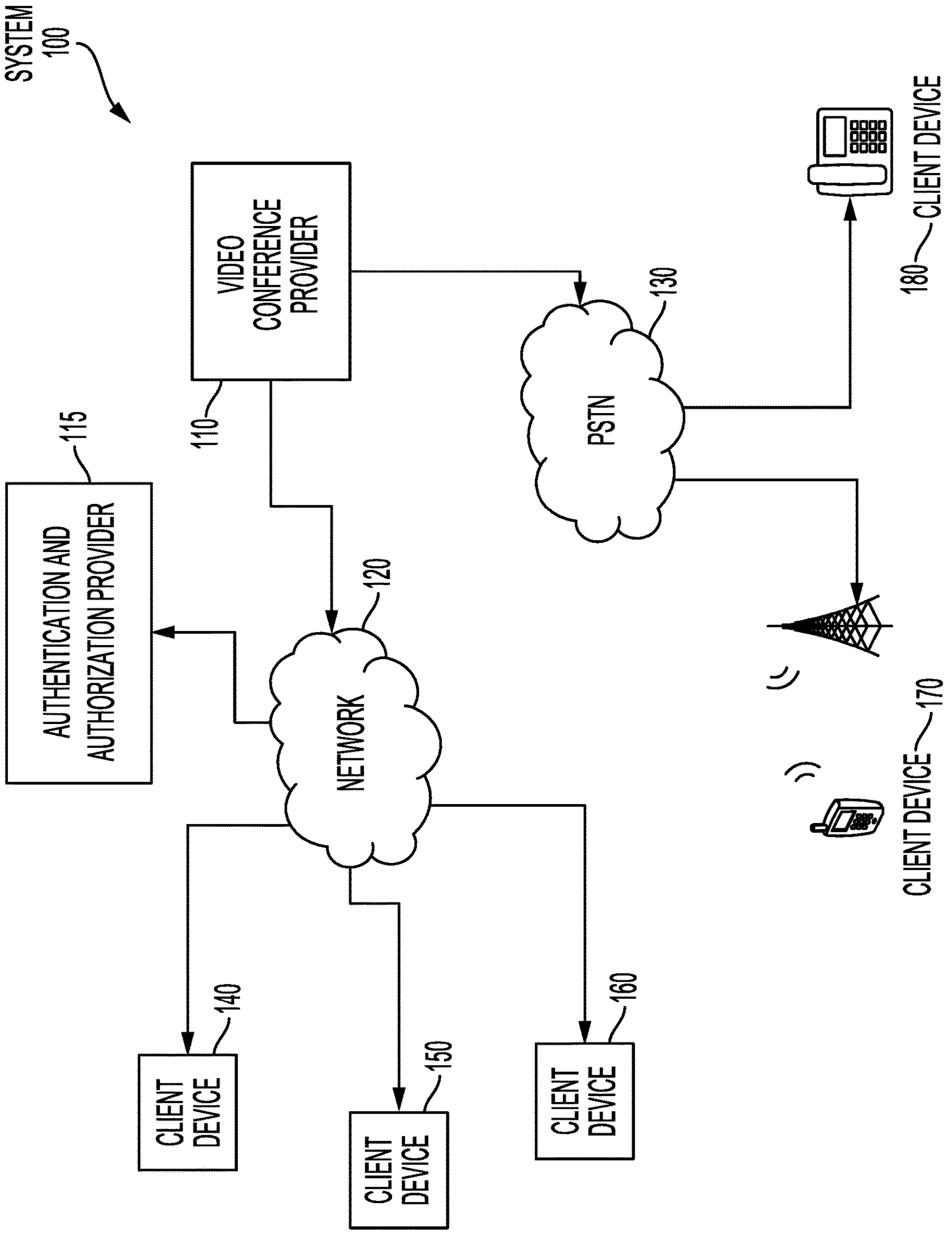
FIG. 1 shows an example system that provides videoconferencing functionality to various client devices.

Examples are described herein in the context of techniques for synthesizing multi-accent speech using adaptive weights. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

The synthesis of realistic-sounding speech from text is an area of significant interest for developers of modern communications technologies. Some applications of text-to-speech (TTS) synthesis may include accessibility tools, virtual assistants, audiobook production, language learning, or interactive voice response (IVR) systems, among others. Some examples of TTS synthesis may sound robotic or otherwise obviously computer-generated.

At the same time, as video conferencing continues to become an essential component of personal and enterprise communications, challenges relating to national or cultural differences stemming from language, dialect, and accent simultaneously become more salient. Some video conferencing systems, for example, may provide features for near real-time translation of speech. Such translation systems may involve the transcription of a recorded video conference followed by the translation of the textual transcription. Thus, in the context of video conferencing, TTS may be used, for example, to synthesize the transcribed or translated text of a recorded video conference into audible speech. Such output can be used, for instance, to create dubbed versions of recorded video conferences in different languages or for accessibility purposes. Similarly, dubbed versions of transcribed video conferences may be created using different voices for, for example, entertainment or aesthetic reasons.

One aspect of cross-cultural communication that can impact the effectiveness of a synthesized voice presentation involves accents. For example, a synthesized version of a video conference transcript created using a TTS synthesizer may synthesize multiple voices in the language of the transcript. Voice may refer to tone, pitch, accent, timbre, and other qualities that give speech distinctive qualities. But the voices may not accurately reflect variations in individual accents in the language of the transcript. Such accents can vary regionally, socially, or based on linguistic background.

Some TTS systems use machine learning (ML) techniques to generate synthesized speech from text inputs. For example, an ML model may be trained using examples of a single speaker's voice to generate synthesized words and phrases not included in the training data. Some TTS systems can synthesize written text into multiple voices that are characterized by differences in pitch, timbre, intonation patterns, and speaking style. For example, some TTS systems can, for a given input text, synthesize a male voice and a female voice. Or some TTS systems may, for a given input text, synthesize a deep male voice, a higher-pitched male voice, and an even higher-pitched male voice. Such systems may be knowns are multi-speaker TTS systems.

Existing multi-speaker TTS systems may synthesize speech using only a few seconds of speech from the target voice. Such multi-speaker TTS systems require a large amount of training data, including a substantial number of speakers, which may be difficult to obtain, particularly for low-resource languages. Moreover, such systems, even when adequately trained across a large number of voices, cannot reproduce the pronunciation of vowels, consonants, intonation patterns, and rhythm that characterize different accents among multiple speakers in the same language. The capability to change an accent is thus an unmet need in TTS systems based on machine learning technologies, particularly by users and communication devices seeking the highest possible degree of fidelity between a real human accent and a synthesized accent for international or cross-cultural communications applications.

This unmet need can be addressed using techniques for synthesizing multi-accent speech using adaptive weights. In an example application, a transcript of a video conference with multiple participants of varying voices and accents may be available. The transcript may be used to synthesize speech using a TTS system. The TTS system can be configured to match both the voices and the accents of the original participants when the using a TTS system trained using the techniques of the present disclosure, given small samples of the varying voices and accents.

The following non-limiting example is provided to introduce certain examples. In one example, a video conference provider first receives a text input. The text input may be a transcript of a video recording that has been translated into another language or may be arbitrary text input. For instance, a TTS synthesizer utility may be provided to create an audio message for a voicemail box, eliminating the need to record a message and providing a reasonable default. The text input may be provided to the video conference provider using an input device like a keyboard, by uploading a file, or any other suitable means for communicating text to the TTS system of the video conference provider.

The video conference provider then receives information about a desired accent. For example, the TTS system of the video conference provider may accept several inputs to configure the target language, voice, accent, and other characteristics of the synthesized speech needed for the application. The information about the desired accent may be provided using a suitable graphical user interface (GUI) control, like a drop-down menu. For example, a GUI control for English accents may include American, British, Irish, Scottish, South African, and so on. In some examples, the trained ML model can be configured to support multiple accents, such that the same input text can be synthesized into multiple accents.

The video conference provider then accesses a trained ML model, which is trained to synthesize, from inputted text, waveforms representing speech. For example, the ML model may be trained using training data that includes labeled examples of multiple voices and multiple accents. The ML model may be trained to accept a text input, a selected voice, and a selected accent, and to output a waveform that corresponds to the text input, the selected voice, and the selected accent with high fidelity.

The video conference provider applies one or more adaptive weights to the first trained machine learning model, the one or more adaptive weights characterizing the first accent. The adaptive weights may include information, like numbers, generated during the training of the ML model. In particular, the adaptive weights may each include one or more terms that characterize different components of the training data. The adaptive weights may each include a shared term that characterizes at least all of the accents that the trained ML model was trained on. The adaptive weights may also each include both a multiplicative term and a bias term that characterizes only the desired accent. Thus, the adaptive weights may be used to represent features shared between accents and features that must be selectively represented. The underlying trained ML model can switch between different modes of synthesis depending on the input accent being processed.

The video conference provider then synthesizes, by applying the one or more adaptive weights to the trained ML model, a waveform representing the text input that is characterized by the desired accent. The waveform may be a digital representation of a quantity, like air pressure or voltage, over a period of time that corresponds to the synthesized speech that is generated from the input text by the TTS system. In some examples, the waveform may be played through an audio output device, such as speakers or headphones, and can be heard as audible speech.

In some examples, embedded representations of the input text and the target accent may be used to both train the ML model and during inference (e.g., synthesis of speech as part of an application). The embedded representations encode the qualitative input information in a way that is suitable for processing by an ML model that may require quantitative data for training and inference. In an embedded character representation, individual characters in the input text may be mapped to numerical vectors that capture the semantic and syntactic information of each character. Likewise, the information about the desired accent may be converted to an embedded accent representation, also a representation of the accent information as a numerical vector. For each embedded character representation, the embedded character representation and the embedded accent representation may be combined before being input to the ML model.

In some examples, the ML model may have various components. For example, the trained ML model may be a conditional variational autoencoder with normalizing flow. This type of ML model is designed to generate accented synthesized speech by first learning the underlying probability distribution of different facets of the training data, and then predicting the form of the waveform of the output data (e.g., synthesized speech) given new input data. TTS systems with this property may be referred to a zero-shot TTS system, in reference to the capability to synthesize speech given inputs not explicitly found in the training data.

In some examples, the ML model may include a text encoder. The text encoder may be a transformer-based text encoder. A transform-based text encoder can convert embedded input text into numerical values by applying certain transformations to capture specific aspects of the input text. For example, the transform-based text encoder may be configured to capture contextual relationships between embedded input elements and represent those relationships as numerical values.

In some examples, the ML model may include a vocoder. The vocoder may be trained to transform a symbolic linguistic representation of the input text, like a latent speech signal used internally by the ML model, into a synthesized version that can be played using an audio output device. In some examples, the vocoder may be a generative adversarial network.

The innovations of the present disclosure provide significant improvements in the field of text-to-speech synthesis technology. Existing systems may have certain shortcomings relating to their ability to synthesize accented speech. For example, synthesized speech for accessibility tools cannot accurately reproduce the speaker's voice without the capability to synthesize accented speech. In another example, IVR systems (e.g., speech-enabled customer service systems) may fall short of consumer expectations without the capability to generate accented speech. To achieve any diversity with respect to accented synthesized speech, some existing systems must be trained using each individual accent, which is expensive and impractical.

The techniques of the present disclosure may enable the synthesis of accented speech in multiple voices with only a small sample of the desired accented voice relative to the size of the training data used to train the ML model through the incorporation of the adaptive weights. For example, the shared component of the adaptive weights may be trained once using a large corpus of accented voices, which may take a considerable amount of time. Subsequently, the multiplicative and bias components of the adaptive weights can be trained using a comparatively small sample of the target accent. The training of the multiplicative and bias components specific to the desired target accents can enable TTS systems to rapidly synthesize accented speech in low-resource scenarios (e.g., only small amounts of data in the target accent are available).

Additionally, the techniques of the present disclosure constitute advancements to the field of ML-based speech technologies more generally. For example, the techniques may enable the generation of significantly more non-native accented speech for the training of augmented speech recognition models. Likewise, the techniques can be used for the generation of paired audio recordings of the same voice in different accents to train accent conversion models.

These illustrative examples are given to introduce the reader to the general subject matter discussed herein and the disclosure is not limited to these examples. The following sections describe various additional non-limiting examples and examples of systems and methods for pronunciation services for video conferencing.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
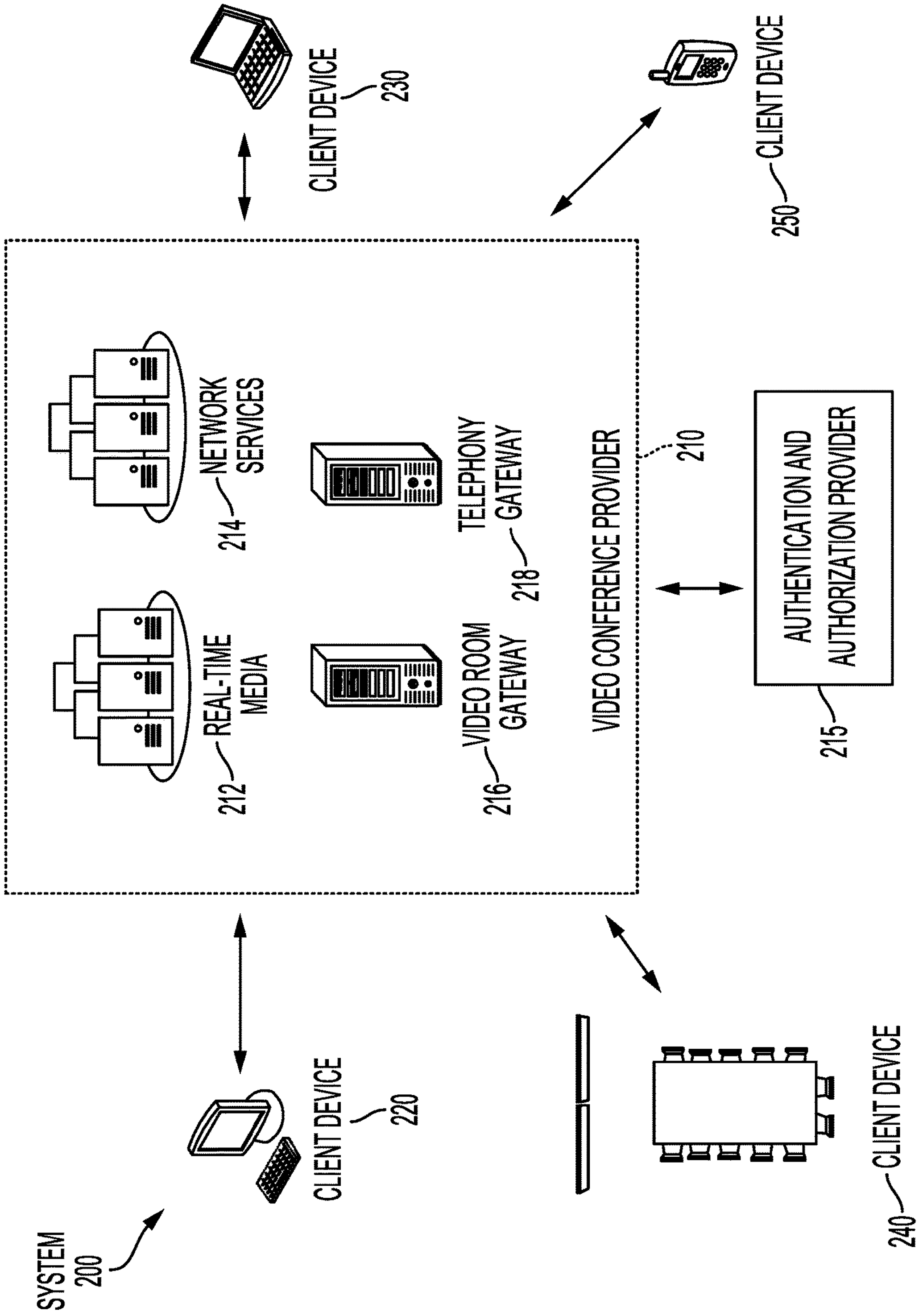
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as hardware authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3A:
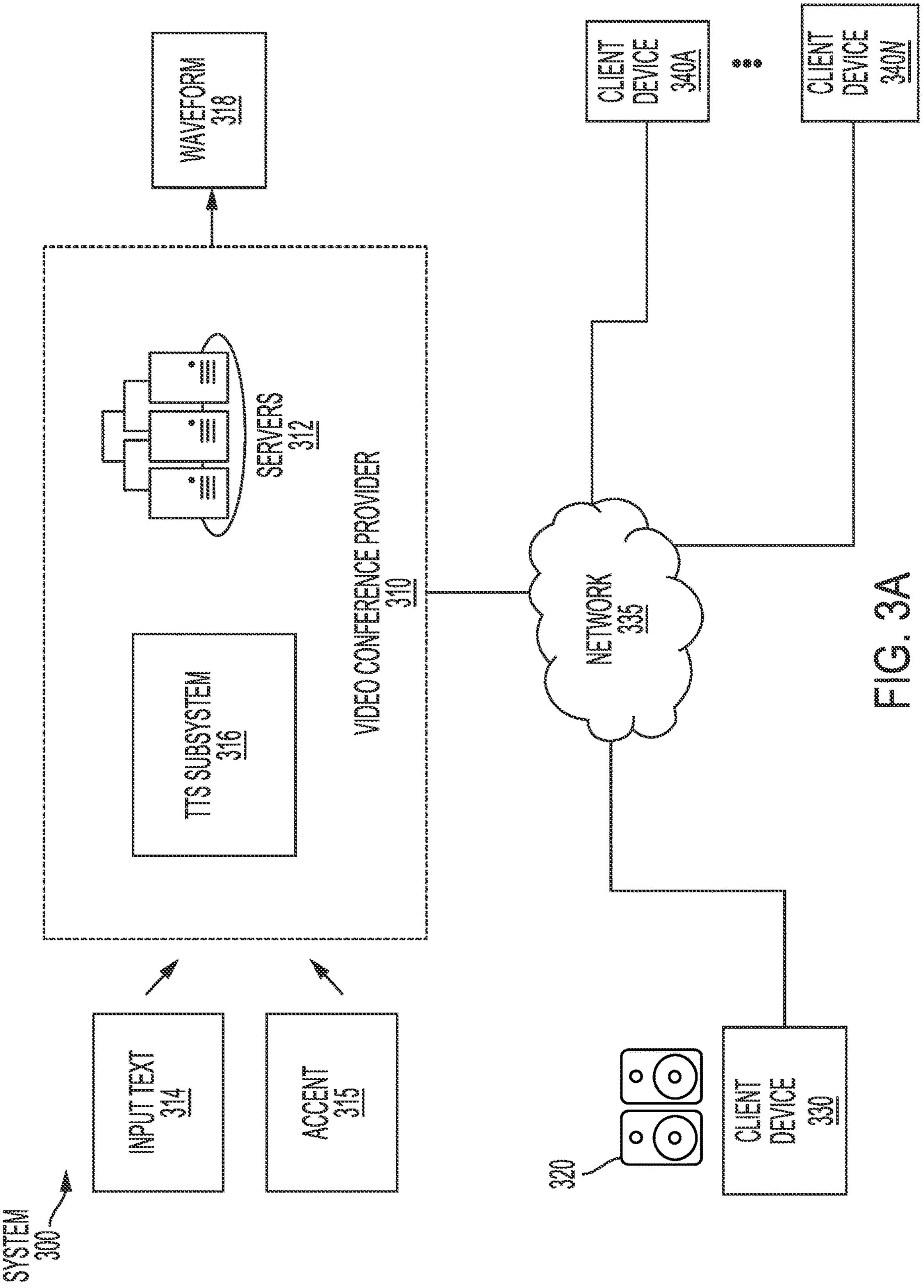
FIGS. 3A-B show example systems for synthesizing multi-accent speech using adaptive weights, according to some aspects of the present disclosure.
Figure 3B:
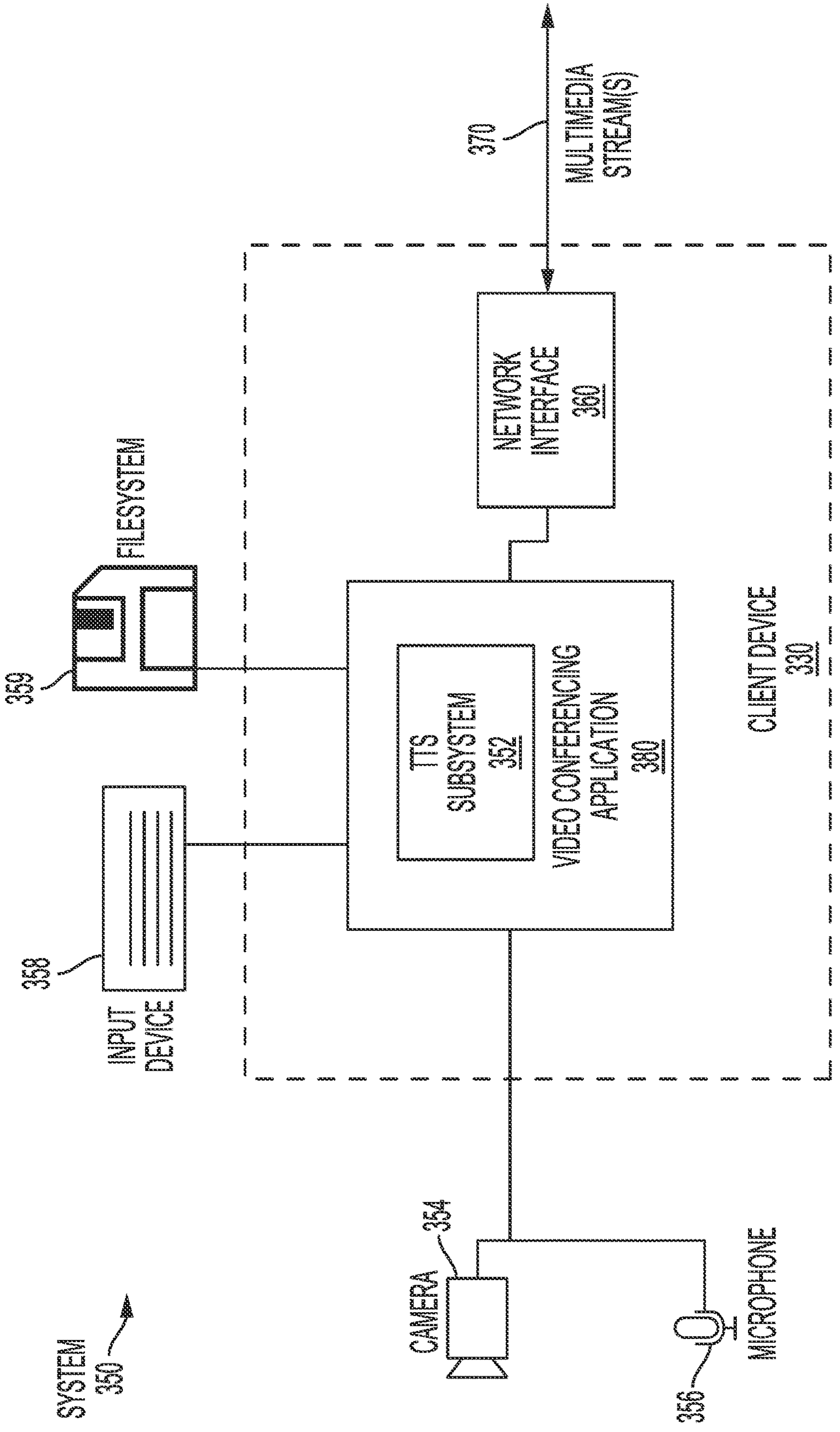

Referring now to FIGS. 3A-B, FIG. 3A shows an example of a system 300 for synthesizing multi-accent speech using adaptive weights, according to some aspects of the present disclosure. The system 300 includes a video conference provider 310, which can be connected to multiple client devices 330, 340*a*-*n* via one or more intervening communication networks 335. In this example, the communications network 335 is the internet, however, any suitable communications network or combination of communications network may be employed, including LANs (e.g., within a corporate private LAN), WANs, etc.

Each client device 330, 340*a*-*n* executes video conference software that connects to the video conference provider 310 and joins a meeting. During the meeting, the various participants (using video conference software or "client software" at their respective client devices 330, 340*a-n*) are able to interact with each other to conduct the meeting, such as by viewing video feeds and hearing audio feeds from other participants, and by capturing and transmitting video and audio of themselves.

Text-to-speech (TTS) synthesis is provided by a TTS subsystem 316 executed by one or more servers 312 or any other suitable type of processing device maintained by the video conference provider 310. TTS subsystem 316 can be executed and its services allocated to video conferences hosted by the video conference provider 310. The TTS subsystem 316 in this example employs a trained machine learning (ML) model to convert input text 314 and a specified accent 315 to a waveform 318 characterized by the specified accent 315 that can be played on one or more audio output devices 320 communicatively coupled to client device 330. The trained ML model may be trained to output a waveform 318 with a particular accent or output multiple waveforms 318, each having a different accent, according to the accent(s) specified 315 along with the input text 314.

Client device 330, 340*a-n* may join video conferences hosted by the video conference provider 310 by connecting to the video conference provider 310 and joining a desired video conference, generally as discussed above with respect to FIGS. 1-2. Once the participants have joined the conference, they may interact with each other by exchanging audio and video feeds. In some cases, these video conferences may be recorded and transcribed or transcribed in real-time, during the meeting. Some participants may require the transcript to be synthesized into speech. For example, the video conference provider 310 may provide accessibility services that include synthesized-speech versions of transcribed video conferences or translation services that include redubbed versions of recorded video conferences.

A video conference recording may be redubbed in the same language for localization applications in order to cater to the target audience's linguistic or cultural preferences. Videos may also be redubbed for audio quality enhancement, for legal reasons (e.g., to remove licensed audio), or when a participant requests their voice be removed from a recording. With respect to accessibility, video recordings may be redubbed including audio description (sometimes also called descriptive video). Audio description may involve adding an additional audio track to the video can include description of the visual elements and actions happening during the video for the benefit of viewers that are blind or visually impaired.

To request accented TTS services, a participant may select an option within their client software to enable a TTS process. They may then select a desired accent and specify the input text (or the associated service). For example, the client software may provide a service to transcribe and dub a recorded meeting using voices and accents similar to the ones from the original recording for accessibility purposes. The client software then sends a request to the video conference provider 310 for the selected TTS services.

In some examples, TTS services may be selected when meetings are configured. For example, when a video conference is created by a host or organization, a dubbed copy of the video conference using voices and accents similar to the original participants may be specified for generation in the conference pre-configuration. The TTS subsystem 316 may thus be configured to synthesize speech in using the accents from the original recording. In another example, a meeting may be configured with certain accessibility features enabled that include a speech-synthesized version of a transcription of the video conference. The TTS subsystem 316 may again be configured to synthesize speech based using the accents from the original recording or another specified accent.

After receiving a request for TTS services, the video conference provider 310 receives an input text 314 and a specified accent 315 corresponding to the selected service (e.g., a transcript of a recoded meeting) and generates a waveform 318 characterized by accent 315 which can then be played on one or more audio output devices 320, like speakers, headphones, etc. The generated waveform 318 can be provided to the requesting participants once the synthesis is complete or in portions as the synthesis proceed. In some examples, a dubbed version of the video conference using synthesized speech similar to the voices and accents of the original participants may be made available to the host or participants.

Referring now to FIG. 3B, FIG. 3B shows an example system 350 in which the TTS subsystem 352 is hosted on a client device. The client device 330 executes a software client, referred to as the video conferencing application 380 in this example. The video conferencing application 380 receives audio and video data from a microphone 356 and a camera 354, respectively, connected to the client device 330. During a video conference, the video conferencing application 380 encodes the received audio and video data and transmits them to the network as multimedia streams 370 using a network interface 360. In addition, the video conferencing application 380 receives audio and video streams from the video conference provider 310 for presentation to the user.

In this example, the video conferencing application 380 includes TTS subsystem 352 that includes one or more trained ML models, such as those described above with respect to FIG. 3A. The TTS subsystem 352 can receive incoming input text from one or more input devices 358 or filesystems 359 for synthesis into speech using a specified voice and accent.

For example, the client device 330 may receive a transcript of a recorded meeting from the video conference provider 310. Due to low audio quality or to overcome accessibility issues, the client device 330 may cause TTS subsystem 352 to synthesize speech using similar voices and accents to produce a dubbed copy of the recorded video conference. The TTS subsystem 352 on the client device 330 includes a pre-trained ML model and in most cases is not used for training due to limits on computational resources available on client device 330. TTS subsystem 352 may access some data or computational resources from, for example, video conference provider 310 during location generation of accented speech.

Figure 4A:
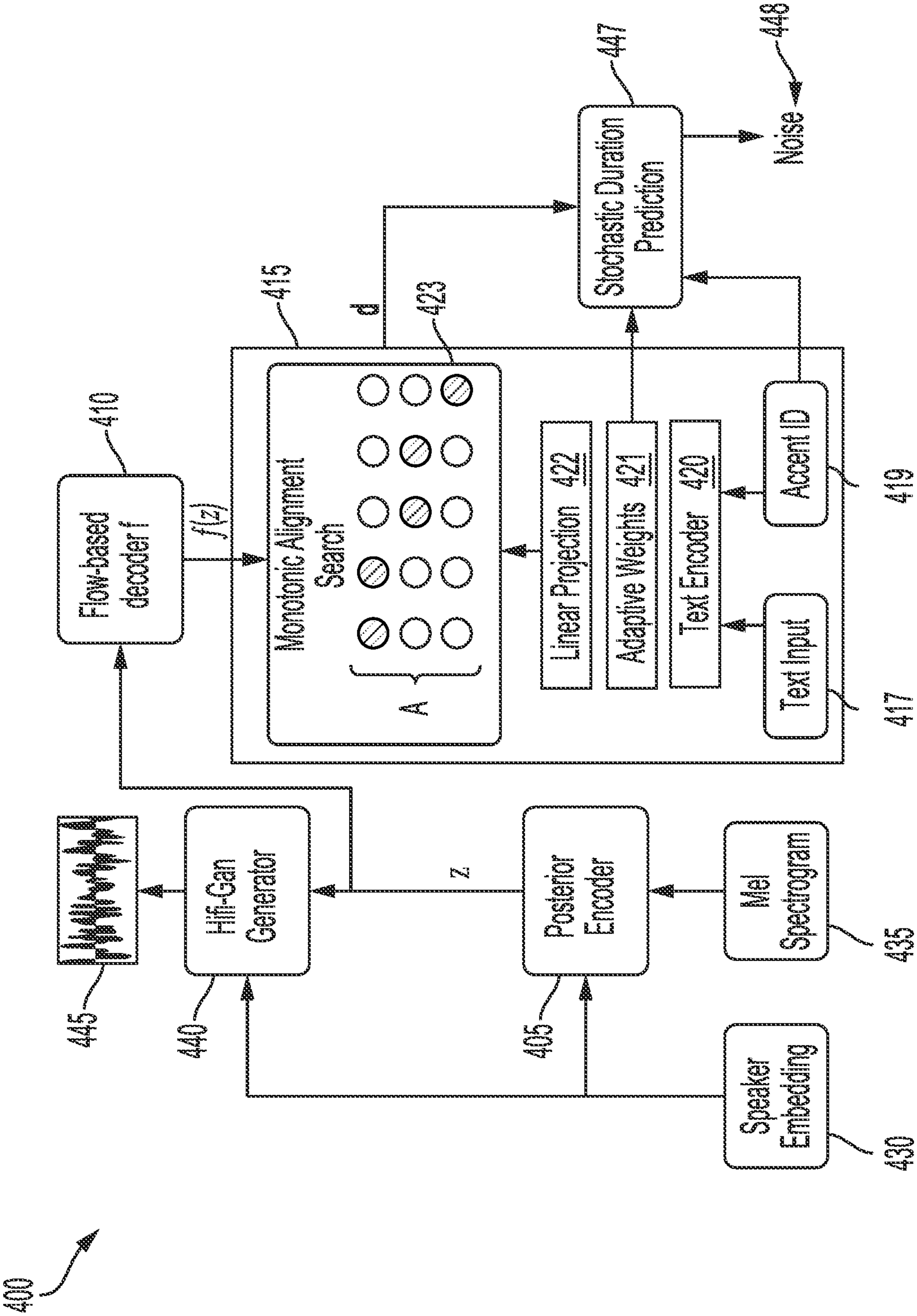
FIGS. 4A-B show example systems for synthesizing multi-accent speech using adaptive weights, according to some aspects of the present disclosure.
Figure 4B:
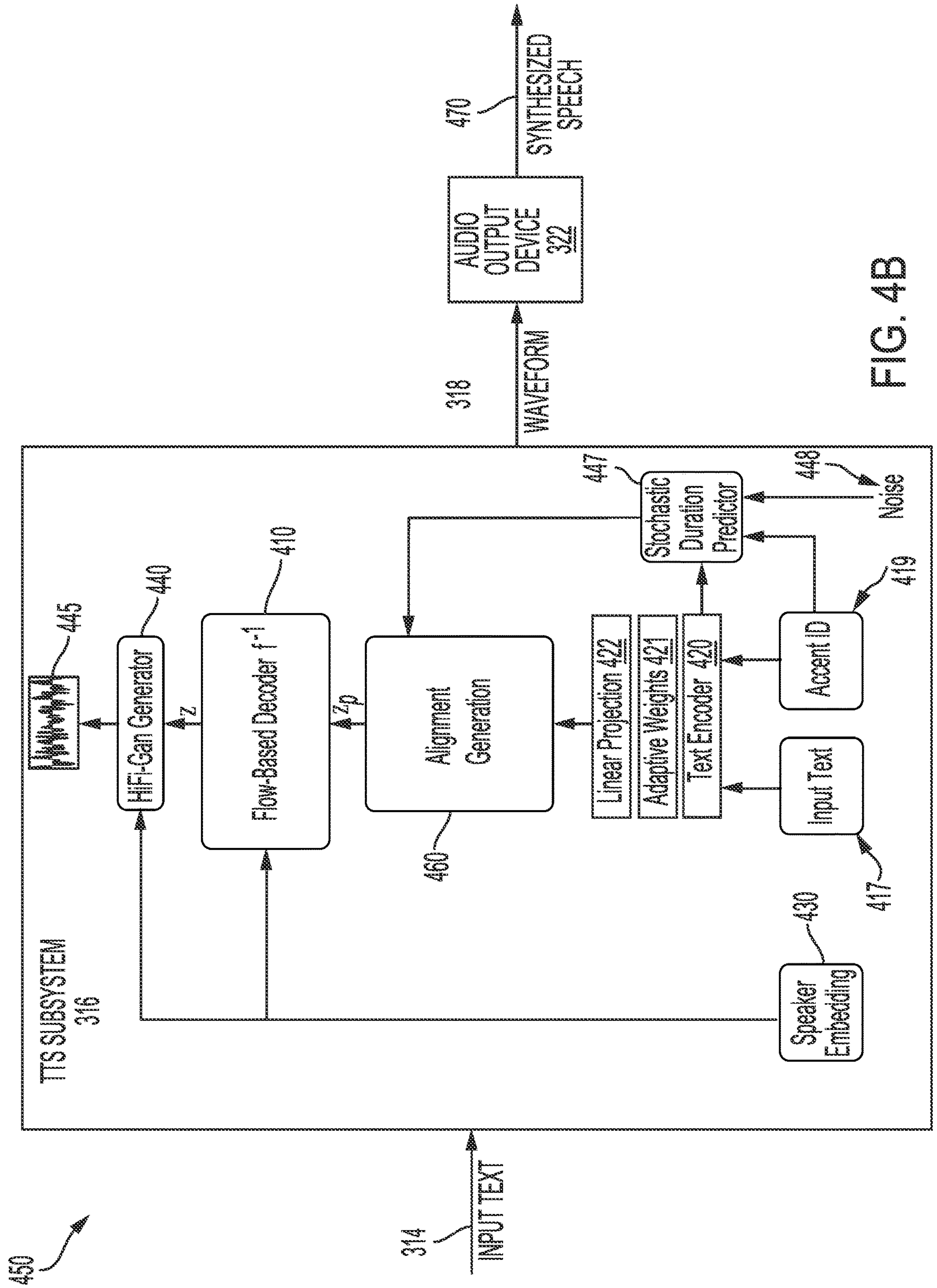

Referring now to FIGS. 4A-B, FIG. 4A shows a block diagram of an example system 400 for training a system 450 (see FIG. 4B and accompanying description) for synthesizing multi-accent speech using adaptive weights, according to some aspects of the present disclosure. The system 400 is based on a conditional variational autoencoder augmented with normalizing flow. An autoencoder typically includes an encoder network and decoder network. The encoder may compress input data into a lower-dimensional latent space representation, while the decoder can reconstruct the input data from the latent representation. The autoencoder may be trained to minimize the reconstruction error between the input data and the reconstructed output.

A variational autoencoder (VAE) is an autoencoder that incorporates probabilistic modeling, such that the encoder may also generate a probability distribution characterizing the input data in addition to the lower-dimensional latent space representation. The VAE may be trained to maximize a lower bound approximation of the log-likelihood of the observed data (e.g., the evidence lower bound (ELBO)). Because the encoder can model the probability distribution of the input data, it can be used for generative applications including, for example, speech synthesis.

Thus, in a simple example of a TTS system that uses a VAE, the VAE could be trained to output synthesized speech given examples including text inputs and their associated waveforms. In a conditional variational autoencoder (CVAE), the VAE model can be conditioned on additional variables or attributes, for example, information about a certain accent. During training, the CVAE may generate outputs that not only resemble the training data but also align with the provided conditional information.

The CVAE may include a posterior encoder 405, a flow-based decoder 410, and a conditional prior network 415. The CVAE is coupled with a waveform generator network (vocoder) 440 to facilitate end-to-end training of the TTS training system 400. The posterior encoder 405 can receive speaker embedding 430 and an associated spectrogram 435 derived from a corpus of speech data. For example, speaker embedding 430 may be generated using a speaker encoder (not shown). In some examples, spectrogram 435 may be a mel-spectrogram, which can be used to approximate human perception of different frequency bands. Posterior encoder 405 may generate latent variables z.

Flow-based decoder 410 may condition the latent variables z and speaker embeddings 430 with respect to a prior distribution f(z) conditioned by conditional prior network 415. The conditioned prior distribution is generated using text input 417 and accent ID 419 input to text encoder 420. Text input 417 and accent ID 419 may both be encoded into embedded representations prior to input to text encoder 420. For example, the accent ID 419 may be encoded into a 16-dimensional accent embedding. Each character of text input 417 may be encoded an embedded character representation. In some examples, each embedded character may be combined with the accent embedding. For example, each character embedding can be concatenated with the corresponding accent embedding.

In some examples, text encoder 420 is a transformer-based text encoder. For example, the transformer-based text encoder 420 may include 10 transformer blocks and 196 hidden channels. Adaptive weights 421 are combined with elements of the text encoder 420. The adaptive weights 421 can thus, for example, directly influence each layer function in the transformer blocks, such as the query-key-value (QKV) projection layer used in transformer self-attention mechanisms. The output of the text encoder 420 is followed by a linear projection 422 to match the dimensionality of the text encoder 420 and the monotonic alignment search (MAS) 423.

The output of the flow-based decoder 410 is aligned with the output of the text-encoder 420 and linear projection 422 using MAS 423. The MAS may be used to align input text 417 with synthesized speech such that there is a one-to-one correspondence between the components of the input text the components of the synthesized speech. The system 400 may include a stochastic duration prediction neural network 447 that can be trained to make the synthesized speech sound more natural through realistic human speech rhythms. The stochastic duration prediction network 447 receives a duration d from monotonic alignment search 423 and outputs noise 448 that can be used to sample the speaker embeddings 430.

Conditioned latent variables z and speaker embeddings 430 are used as input to the vocoder generator 440 which generates the waveform 445. Vocoder (voice encoder) 440 can be a neural network that is trained to generate audio waveforms. In some examples, vocoder 440 may be a generative adversarial network (GAN) that is adversarially trained to generate waveforms. In some examples, the vocoder 440 may include a GAN implementation capable of generating high fidelity speech efficiently. The CVAE (posterior encoder 405, flow-based decoder 410, and prior conditional network 415) and the vocoder 440 may be trained in parallel so that no intermediate representation between the two networks is necessary.

In some examples, the adaptive weights 421 are composed of multiple terms. For example, the adaptive weights 421 may include a shared term, a multiplicative term, and a bias term. The inclusion of a shared term is based on the similarity of the phoneme set, the character set, and the word set for some accents. Meanwhile, some accents may differ in various aspects such as phonetics (e.g., acoustic realization of the same phoneme), prosody, and pronunciation. These differences may correspond to the multiplicative and bias terms. The multiplicative term may operate on the shared term, which can directly change the magnitude and direction of the weights included in the shared term. The bias term can provide content-based bias based on the input features. A “semi-shared” architecture thus results from the use of the shared term, shared among all accents supported by the TTS system, while each supported accent has a corresponding pair including a multiplicative term and a bias term. For example, the shared term may be multiplied by the multiplicative term and that product may be added to the bias term.

In some examples, the adaptive weights 421 may be expressed as a matrix. Matrix multiplication may be a component of some ML algorithms. For example, matrix multiplication may be used to implement forward propagation in a neural network, such as when computing the activation of a fully connected layer. An input vector can be multiplied by a weight matrix and added to a bias vector to produce the output vector. In this example, adaptive weights 421 may used in lieu of or in addition to the weight matrix.

In some examples, the adaptive weights 421 matrix may be decomposed into a product of matrices. Matrix decomposition can reduce the dimensionality of data by approximating a high-dimensional matrix with a lower-dimensional representation. In effect, matrix decomposition allows for the compression of data by representing a matrix using fewer parameters. Decomposed representations can be generated through various available matrix decomposition techniques resulting in reduced computational complexity, the reduction of noise or redundancy, and the extraction of essential information from the matrix, with minimal loss of function.

For example, one method of matrix decomposition may include rank decomposition, sometimes referred to as rank factorization. Rank decomposition may refer to expressing a given matrix as a product of matrices with a specific rank structure. In matrix algebra, the rank of a matrix is the number of linearly independent row or columns in the matrix.

One method of rank decomposition may include rank-1 factorization. In rank-1 factorization, a matrix is factorized into the outer product of a column vector and a row vector.

The resulting matrix is of rank 1 meaning it has only one non-zero singular value. The singular values of a matrix can be numbers that represent the scaling factor by which a matrix transforms a vector and may be equal to the square root of an eigenvalue of the matrix obtained by multiplying the matrix by its conjugate transpose. In some examples, the adaptive weights 421 may be expressed as the outer product of two vectors.

Another method of rank decomposition may include a low-rank approximation. In a low-rank approximation, a matrix is decomposed by approximating it with a lower-rank matrix. The original matrix is represented with a limited number of singular values and corresponding singular vectors, effectively compressing the information while minimizing loss. In some examples, the adaptive weights 421 may be expressed using a low-rank approximation.

Yet another method of rank decomposition may include a rank-r approximation. In r-rank approximation, a matrix may be factorized into a sum of r rank-1 matrices. In some examples, the 1-rank matrices can be expressed as a dot product between two vectors. The resulting summation of 1-rank vectors has rank at most rank r. In some examples, the adaptive weights 421 can be factorized using an r-rank approximation, in which each rank-1 matrix corresponds to a supported accent.

In some examples, rank factorization may involve singular value decomposition (SVD). In SVD, a matrix may be decomposed into three parts: a matrix of left singular vectors, a diagonal matrix of singular values, and a matrix of right singular vectors. The singular values in the diagonal matrix represent the magnitude of the singular vectors and indicate the importance or significance of each vector in capturing the matrix's variability. SVD may be used as a step in carrying out several methods of rank factorization, including rank-1 factorization, low-rank factorization, and r-rank factorization.

Other mathematical methods may be employed for performing rank factorization. For example, rank-revealing QR (RRQR) factorization can be used to determine the rank of a matrix. In RRQR, a matrix may be decomposed into the product of two matrices, including an orthogonal matrix (Q) and an upper triangular matrix (R). RRQR may be used to efficiently approximate the rank of a given matrix while providing a low-rank representation that reveals the essential structure of the original matrix. One of ordinary skill in the art will recognize that the overview of some matrix decomposition methods herein are only examples. Other methods of matrix decomposition may be used for synthesizing multi-accent speech using adaptive weights, including non-negative matrix decomposition, sparse matrix factorization, and tensor factorization.

FIG. 4B shows a block diagram of a system 450 for synthesizing multi-accent speech using adaptive weights. The training system 400 may be used to train the system 450, which can then be used for speech synthesis or inference. System 450 may be included in, for example, TTS subsystem 316. The components of system 450, including, for example, the weights of the various neural networks making up system 450, may be trained in a separate computing environment. For instance, training using training system 400 may be performed in a high-performance cloud computing environment. The parameters and weights determined during can then be transferred to, for example, a server in the video conference provider 310 hosting system 450 for speech synthesis. During inference the weights of the various networks constituting system 450 may be constant. However, some examples, may utilize online training in which the weights of the various networks are updated during inference based on a feedback mechanism.

System 450 shares most components with the training system 400, as seen in FIG. 4B. However, during speech synthesis, the alignment generation 460 component is used in place of MAS 423. The conditional distribution is predicted by the text encoder 420 and the duration is sampled using noise 448 generated by the stochastic duration predictor 447. Latent variable $z_p$ is thus sampled from the conditional distribution f(z). Flow-based decoder 410 is inverted and may receive as input the latent variables $z_p$ and the speaker embeddings 430. Inverted flow-based decoder 410 can transform the latent variables $z_p$ into the latent variables z, described with respect to training system 400 above. Latent variables z may be input to the vocoder 440, trained to generate the waveform 445.

The system 450 may be a component of TTS subsystem 316. TTS subsystem 316 may receive input text 314, which is converted to synthesized speech characterized by the accent corresponding to accent ID 315 by system 450. System 450 outputs waveform 318, which can be played back as audible synthesized speech 470 by a suitable audio output device 322.

Figure 5:
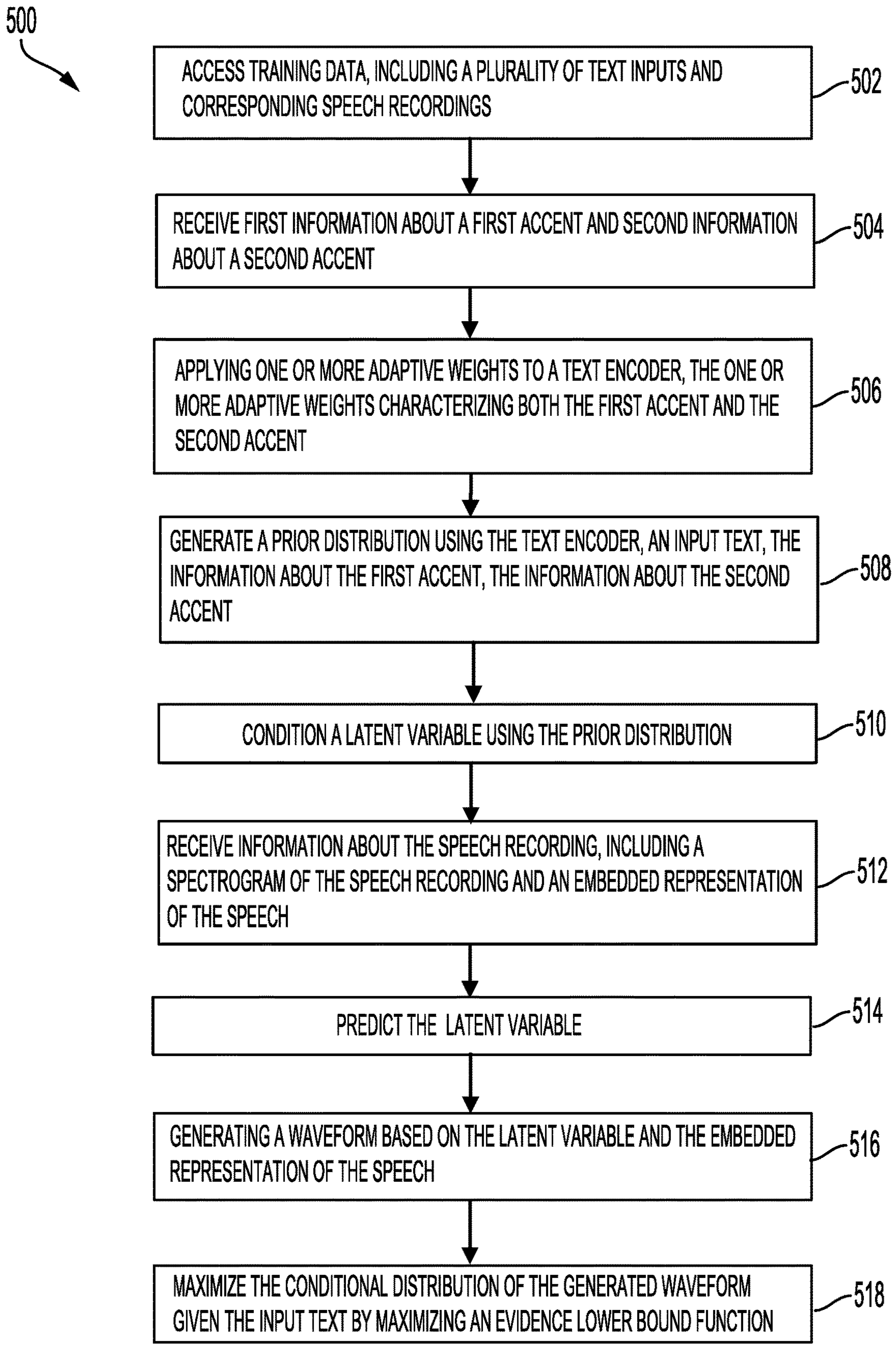
FIG. 5 shows a flowchart of an example method for synthesizing multi-accent speech using adaptive weights, according to some aspects of the present disclosure.

Referring now to FIG. 5, FIG. 5 shows a flowchart of an example method 500 for training a system for synthesizing multi-accent speech using adaptive weights. The description of the method 500 in FIG. 5 will be made with reference to FIGS. 3A-B and 4A-B, however any suitable system according to this disclosure may be used, such as the example systems 100 and 200, shown in FIGS. 1 and 2.

It should be appreciated that method 500 provides a particular method for training a system for synthesizing multi-accent speech using adaptive weights. Other sequences of operations may also be performed according to alternative examples. For example, alternative examples of the present disclosure may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. Further, the operations described in method 500 may be performed by different devices. For example, the description is given from the perspective of the video conference provider 310 but other configurations are possible. For instance, the TTS subsystem 316 may be hosted and trained in a cloud computing environment and accessed by the video conference provider 310 for TTS services once trained. One of ordinary skill in the art would recognize many variations, modifications, and alternatives.

At block 502, the video conference provider 310 accesses training data including a plurality of text and corresponding speech recordings. The text may be unprocessed, plain text for training of the TTS subsystem 352. The text may consist of words, sentences, or paragraphs in a natural language such as English, Spanish, or French. It can include punctuation marks, numbers, and symbols. In some examples, the text (graphemes) may be represented as phonemes. In some other examples, the text may be represented using a representation that relates to pronunciation like the International Phonetic Alphabet (IPA). However, some examples may use unprocessed, plain text as it may produce more accurate results for some low-resource languages for which there may be no grapheme-to-phoneme converters available.

During training of the system 450, the system 450 may be first trained on a large corpus of speech, including a diversity of speakers, voices, and accents. For instance, in some examples, a corpus including 44 hours of speech and 109 speakers may be used. The large corpus can be used to train the shared term of the adaptive weights 421. The shared term of the adaptive weights 421 can be used to generate a component of synthesized speech using any accent. Following training of the shared term, the multiplicative term and bias term of the adaptive weights 421 can be trained using much smaller samples of accented speech characterized by the desired target accents. For instance, in some examples, about 3 hours of accented speech may be used for training of the multiplicative terms and bias terms corresponding to each target accent.

At block 504, the video conference provider receives first information about a first accent and second information about a second accent. Some example TTS systems may be trained on only a single accent, but the techniques of the present disclosure include the capability for multi-accent TTS synthesis, which is appropriate for many applications. Thus, during training, the video conference provider 310 may receive training data including, for example, a text and an associated audio recording read by speakers with different accents. For example, the text "Hello" may be read by an English speaker with an American accent and an English speaker with a British accent. The training data may include suitable annotations that indicate the accent that characterizes each text/audio pairing.

At block 506, the video conference provider 310 applies one or more adaptive weights 421 to a text encoder 420, the one or more adaptive weights 421 characterizing both the first accent and the second accent. For example, the adaptive weights 421 may include a multiplicative term and bias term corresponding to the first accent and the second accent, respectively. The adaptive weights 421 are used in conjunction with the text encoder 420. In some examples, the adaptive weights 421 may correspond to a layer in a neural network. For instance, in a transformer-based text encoder 420 the adaptive weights 421 may be implemented as a layer applied to the output of the transformer blocks.

At block 508, the video conference provider 310 generates a prior distribution using the text encoder 420, an input text 417, the information about the first accent, the information about the second accent. The input text 417 may be drawn from the training data. For example, the text encoder 420 may receive the input text 417 and accent IDs 419 corresponding to the first accent and the second accent, respectively. A character encoder may be used to convert the characters of the input text 417 to an embedded character representation. Likewise, an accent encoder may be used to convert the accent ID 419 into an embedded accent representation. The embedded character representation may be combined with the embedded accent representation prior to being input to the text encoder 420. In some examples, for instance, the embedded character representation and the embedded accent representation can be concatenated.

The text encoder 420 can be used to generate a prior distribution conditioned on the input text 417, accent IDs 419, and the corresponding output of the flow-based decoder 410. The flow-based decoder 410 receives latent variables from posterior encoder 405, as discussed below in block 514. The corresponding output of the flow-based decoder 410 may be additional latent variables generated by the embedded speech 430 and spectrogram 435 corresponding to text input 417 and accent IDs 419.

At block 510, the video conference provider 310 conditions latent variables using the prior distribution conditioned in block 508. The flow-based decoder 410 is trained to learn invertible transformations that map a prior simple distribution (e.g., a Gaussian distribution) to the target conditioned distribution. The flow-based decoder 410 may be invertible, such that each transformation has an inverse operation, allowing for both forward and backward computation. The flow-based decoder 410 can therefore generate data samples from input speaker embedding 430 and spectrogram 435 and also reconstruct the original noise vector from the prior distribution. The latent variables can be obtained by applying the invertible transformations to samples from the prior simpler distribution. To align the output of flow-based decoder 410 with the output of the text encoder 420, a monotonic alignment search 423 (MAS) may be used.

At block 512, the video conference provider 310 receives information about the speech recording, including a spectrogram 435 of the speech recording and an embedded representation of the speech 430. The speaker embedding 430 and spectrogram 435 correspond to the input text 417 and accent IDs 419 received by the text encoder 420. The encoder portion of the CVAE is trained using the speaker embedding 430 and spectrogram 435 to generate the latent variables while the text encoder 420 is used to condition the underlying prior distribution that characterizes the text and accent associated with the speech.

At block 514, the video conference provider 310 predicts the latent variable. The speaker embedding 430 and spectrogram 435 may be received by posterior encoder 405 which can be trained to predict the latent variable. The latent variables are received by the flow-based decoder 410 and the vocoder 440. The flow-based decoder 410 converts the latent variables to another set of latent variables that are used to condition the prior distribution, as described above.

At block 516, the video conference provider 310 generates a waveform based on the latent variables and the embedded representation of the speech. The vocoder 440 receives the latent variables from the posterior encoder 405 and can be trained to output a waveform 445 that corresponds to the accented speech. The vocoder 440 may be an adversarially trained neural network that is trained in parallel with the CVAE components described above for end-to-end training with no intermediate representation that must be passed between models.

At block 518, the video conference provider 310 maximizes the conditional distribution of the generated waveform given the input text by maximizing an evidence lower bound function. This can be represented by maximization of the left-hand side of the equation:

$$\log p(x \mid c) \geq E_{q_\theta(z|x)}[\log p_\phi(x \mid z)] - D_{KL}(q_\theta(z \mid x) \| p_\psi(z \mid c))$$

where x is the speech input, z are the latent variables, and c is the text input. In the equation, p(x|c) is the conditional distribution of x given c, $E_{q\theta(z|x)}[\log p_\phi(x|z)]$ is the lower bound of the log-likelihood and $D_{KL}(q_\theta(z|x)\|p_\psi(z|c))$ is the Kullback-Leibler divergence between the approximate posterior distribution and the prior distribution over the latent variables. E refers to the expectation value of the function $\log p_\phi(x|z)$ over the distribution $q_\theta(z|x)$. $D_{KL}$ refers to the Kullback-Leibler divergence, where $q_\theta(z|x)$ is the distribution encoded by the posterior encoder and $p_{104}$ (z|c) is the distribution encoded by the prior decoder. The posterior encoder 405 is parameterized by θ and the vocoder 440 is parameterized by Ψ.

Figure 6A:
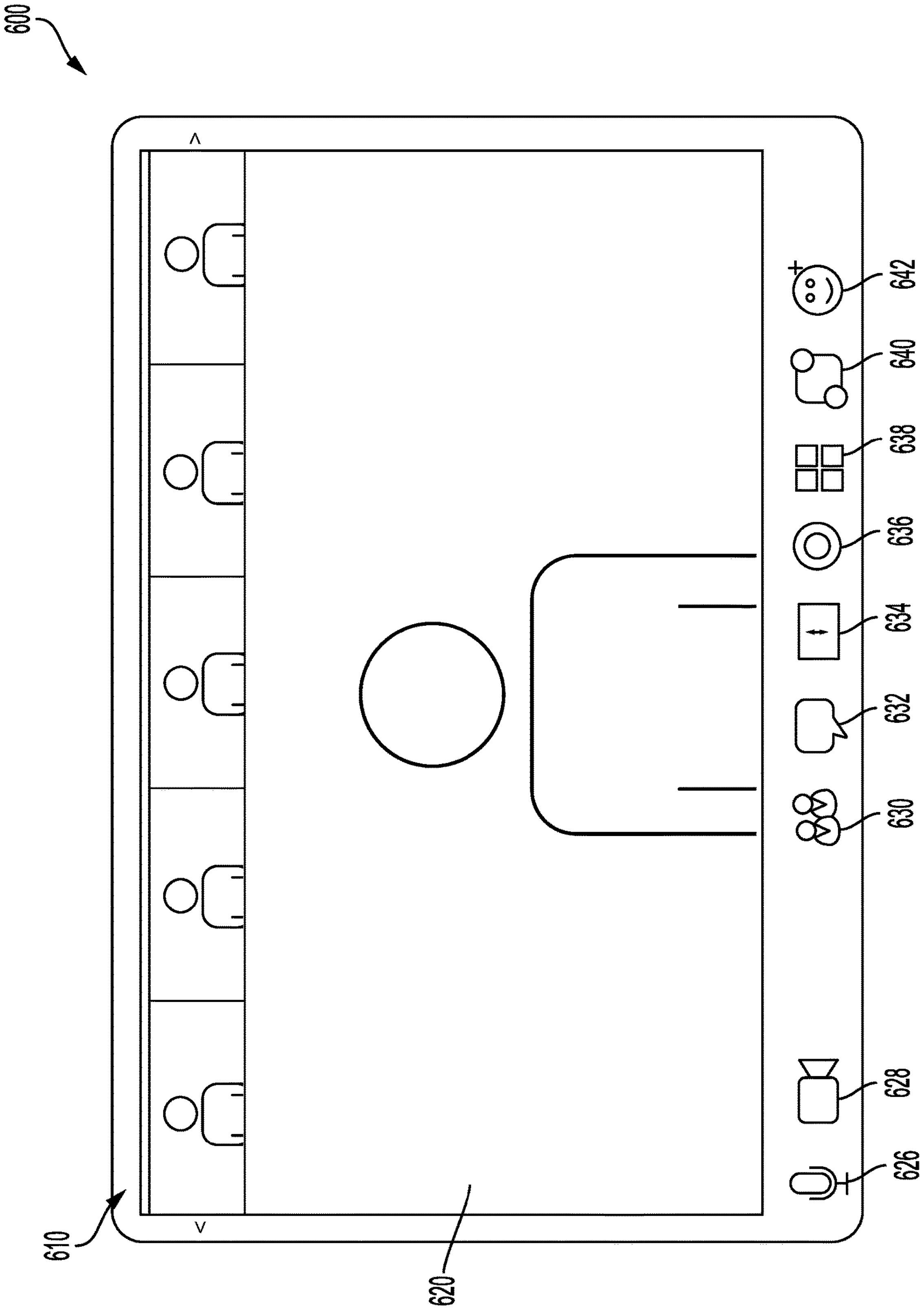
FIGS. 6A-B show illustrations of example graphical user interfaces that may be used with a system for synthesizing multi-accent speech using adaptive weights, according to some aspects of the present disclosure.
Figure 6B:
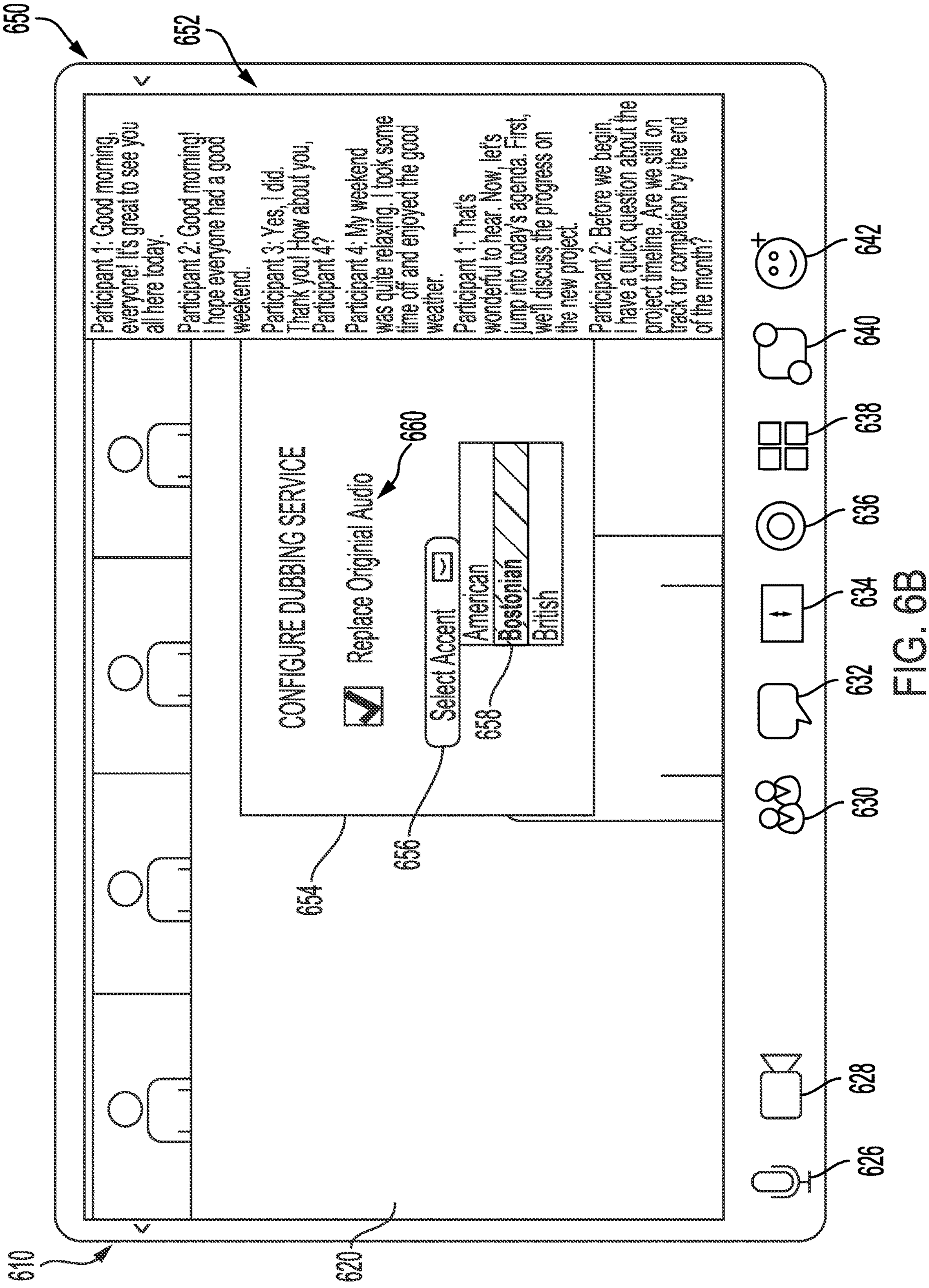

Turning next to FIGS. 6A-B, FIGS. 6A-B show illustrations of example graphical user interfaces (GUIs) that may be used with a system for synthesizing multi-accent speech using adaptive weights, according to some aspects of the present disclosure. The example GUIs may be displayed, for example, on a screen included with client device 330.

FIG. 6A shows an example GUI 600 for a software client that can interact with a video conference provider, such as video conference provider 310, to allow a user to connect to the video conference provider 310, chat with other users, or join virtual conferences. A client device, e.g., client device 330, executes a software client as discussed above, which in turn displays the GUI 600 on the client device's display. In this example, the GUI 600 includes a speaker view window 620 that presents the current speaker in the virtual conference. Above the speaker view window 620 are smaller participant windows 610, which allow the participant to view some of the other participants in the video conference, as well as controls ("<" and ">") to let the host scroll to view other participants in the video conference.

Beneath the speaker view window 620 are a number of interactive elements 626-642 to allow the participant to interact with the virtual conference software. Controls 626-628 may allow the participant to toggle on or off audio or video streams captured by a microphone or camera connected to the client device. Control 630 allows the participant to view any other participants in the virtual conference with the participant, while control 632 allows the participant to send text messages to other participants, whether to specific participants or to the entire meeting. Control 634 allows the participant to share content from their client device. Control 636 allows the participant toggle recording of the meeting, and control 638 allows the user to select an option to join a breakout room. Control 640 allows a user to launch an app within the video conferencing software, such as to access content to share with other participants in the video conference. Control 642 allows a user to react or respond to an event during the video conference by, for example, expressing an emoji or raised hand icon visible by the other participants in the video conference.

A user may interact with such a GUI 600 when their client software is operating in a normal configuration, such as while at home or in an office. Thus, the user has full control over their audio and video settings, can freely chat with other participants, and can use any suitable audio or video encoders to provide high quality audio and video streams to other participants in a virtual conference. However, in other scenarios, the GUI 600 may be restricted to only allow certain functionality or to disable certain functionality.

FIG. 6B depicts a GUI 650 including an option for configuring a video conference dubbing service offered by, for instance, the video conference provider 310. GUI 650 includes a transcript 652 of the video conference. In some examples, a transcript may be provided in real-time as the video conference proceeds. In other examples, the transcript may be obtained after the video conference is concluded based on a recording of the video conference. The video conference provider 310 may provide a transcription service that asynchronously generates a transcript at the completion of the video conference.

GUI 650 may include controls that control or invoke TTS services. For example, dubbing service dialog 654 may include an option to replace the original audio, implemented using checkbox 660. Selection of checkbox 660 may enable dubbing over the original video conference audio using similar voices and a selected accent 658 selected using accent selection control 656. Recorded video conference dubbing services may be offered to cater a target audience's linguistic or cultural preferences. Recordings may also be dubbed for audio quality enhancement, for legal reasons (e.g., to remove licensed audio), or when a participant requests their voice be removed from a recording. With respect to accessibility, video recordings may be dubbed to include audio description (sometimes also called descriptive video). Audio description may involve adding an additional audio track to the video can include description of the visual elements and actions happening during the video for the benefit of viewers that are blind or visually impaired. In such cases, the selection of an accent can enhance the usability of the recording for a listener with certain disabilities.

Various other TTS services may be implemented in other video conferencing applications including voice-overs for animations and characters in educational or theatrical presentations, real-time transcription during video conferences, enhanced presentation experiences, voice synthesis for virtual assistants, and so on. One of ordinary skill in the art will recognize that similar controls to the example GUI 650 will be implemented for other applications.

Figure 7:
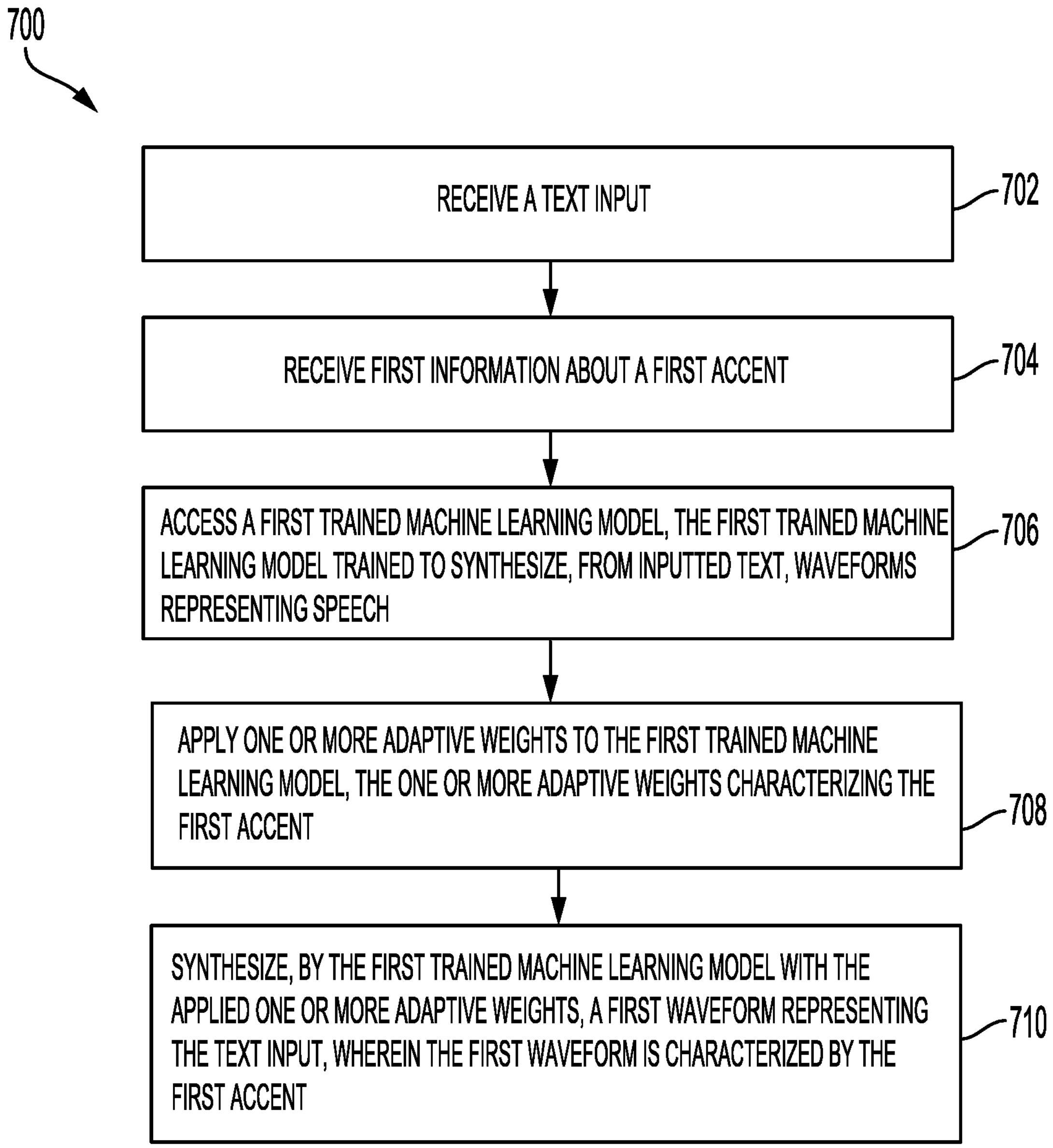
FIG. 7 shows a flowchart of an example method for synthesizing multi-accent speech using adaptive weights, according to some aspects of the present disclosure.

Referring now to FIG. 7, FIG. 7 shows a flowchart of an example method 700 for synthesizing multi-accent speech using adaptive weights. The description of the method 700 in FIG. 7 will be made with reference to FIGS. 3A-B, 4A-B, and 6A-B, however any suitable system according to this disclosure may be used, such as the example systems 100 and 200, shown in FIGS. 1 and 2.

It should be appreciated that method 700 provides a particular method for synthesizing multi-accent speech using adaptive weights. Other sequences of operations may also be performed according to alternative examples. For example, alternative examples of the present disclosure may perform the steps outlined above in a different order. Moreover, the individual operations illustrated by method 700 may include multiple sub-operations that may be performed in various sequences as appropriate to the individual operation. Furthermore, additional operations may be added or removed depending on the particular applications. Further, the operations described in method 700 may be performed by different devices. For example, the description is given from the perspective of the video conference provider 428 but other configurations are possible. For example, the TTS subsystem 352 may be hosted in a cloud computing provider and accessed by the TTS subsystem 352 using a suitable web-based application programming interface (API). One of ordinary skill in the art would recognize many variations, modifications, and alternatives.

At block 702, the video conference provider 310 receives a text input. The text may be unprocessed, plain text. The text may consist of words, sentences, or paragraphs in a natural language such as English, Spanish, or French. It can include punctuation marks, numbers, and symbols. In some examples, the text (graphemes) may be represented as phonemes. In some other examples, the text may be represented using a representation that relates to pronunciation like the International Phonetic Alphabet (IPA). However, some examples may use unprocessed, plain text as it may produce more accurate results for some low-resource languages for which there may be no grapheme-to-phoneme converters available. In a typical use case, the input text may include documents for TTS synthesis like a video conference recording transcript.

At block 704, the video conference provider 310 receives first information about a first accent. As in FIG. 3A, the video conference provider 310 may simultaneously receive a text input 314 and an accent selection 315. Other parameters may be provided relating to the desired speech synthesis as well, including voice selection, speaking rate, pitch and intonation, volume and amplitude, prosody and emphasis, effects and filters, output format, and so on.

At block 706, the video conference provider 310 accesses a first trained machine learning model, the first trained machine learning (ML) model trained to synthesize, from inputted text, waveforms representing speech. For example, the video conference provider 310 may include a TTS subsystem 316 that includes a TTS ML model trained using a process similar to the process described in process 500. Once the TTS model is trained, the fixed weights making up the various neural networks, including the adaptive weights, may be transferred to a server to perform inference or synthesis operations. Such systems may be trained to receive a text input 314 and synthesize it to a particular voice selection and particular accent selection. In some examples, the TTS subsystem 316 may continue training (e.g., online training) while TTS production operations are performed.

At block 708, the video conference provider 310 applies one or more adaptive weights to the first trained machine learning model, the one or more adaptive weights characterizing the first accent. For example, TTS subsystem 316 may include a trained ML model including neural networks with various layers that implement certain calculations inherent to the operation of a neural network. For instance, the ML model may include a transformer-based text encoder 420 component. The transformer-based text encoder 420 may include a number of connected transformer blocks or layers. The adaptive weights may be applied before, among, or after the transformer blocks processing of the text input 314.

The adaptive weights may include a shared component, and multiplicative and bias components that correspond to one of the supported accents. So, for the first accent received in block 704, the adaptive weights may include a multiplicative component and a bias component trained to encode the latent features unique to that first accent. In contrast, the shared component of the adaptive weight encodes the latent features shared among all accents and voices. In some examples, the shared term may be multiplied by the multiplicative term and the bias term added to the resultant product. For instance, the adaptive weights 321 may be represented by matrices, in which the shared term and the multiplicative term are matrices that are multiplied together to obtain a product. Then the bias term is another matrix of the same dimensions as the product that is added to the product matrix. The adaptive weights 321, in this implementation, can represent a transformation that is applied to another matrix or vector.

At block 710, the video conference provider 310 synthesizes, by the first trained machine learning model with the applied one or more adaptive weights, a first waveform representing the text input, wherein the first waveform is characterized by the first accent. For example, the TTS subsystem may include some elements of the trained ML model. The text encoder 420 along with the adaptive weights 421 applied during a specified phase of text encoding can produce the latent probability distribution conditioned during training. The inverted flow-based decoder 410 may convert the latent probability distribution to latent variables. Finally, the training vocoder 440 can convert the latent variables into a waveform 318. The waveform 318 can be played on a suitable audio output device 322 for TTS applications or stored for later used.

Figure 8:
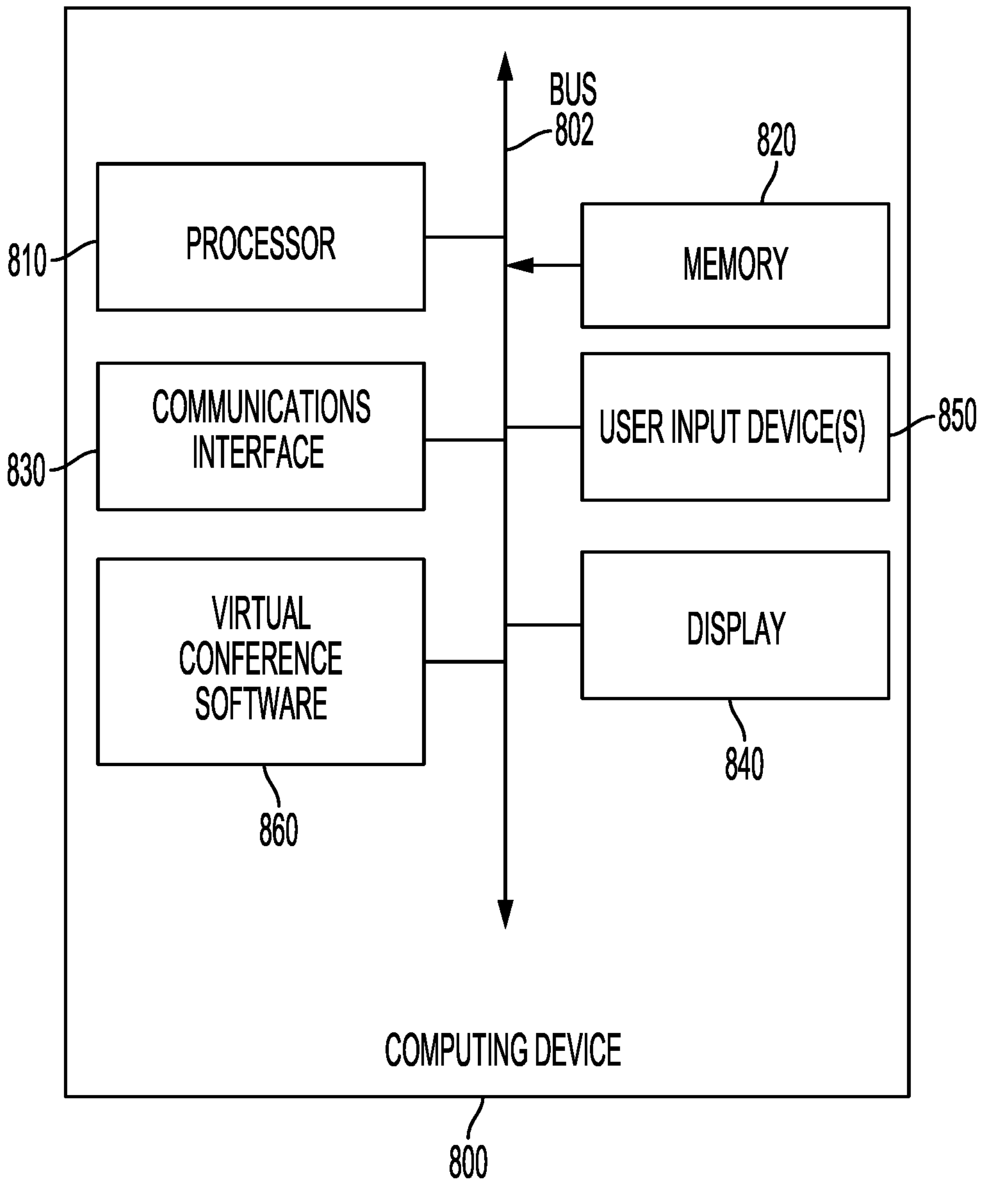
FIG. 8 shows an example computing device suitable for use in techniques for synthesizing multi-accent speech using adaptive weights, according to some aspects of the present disclosure.

Referring now to FIG. 8, FIG. 8 shows an example computing device 800 suitable for use in example systems or methods for synthesizing multi-accent speech using adaptive weights according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for pronunciation services for video conferencing according to different examples, such as part or all of example methods 500 and 700 described above with respect to FIGS. 5 and 7, respectively. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes virtual conferencing software 860 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: receiving a text input; receiving first information about a first accent; accessing a first trained machine learning model, the first trained machine learning model trained to synthesize, from inputted text, waveforms representing speech; applying one or more adaptive weights to the first trained machine learning model, the one or more adaptive weights characterizing the first accent; and synthesizing, by the first trained machine learning model with the applied one or more adaptive weights, a first waveform representing the text input, wherein the first waveform is characterized by the first accent.

Example 2 is the method of example(s) 1, wherein the one or more adaptive weights each include: a multiplicative term and a bias term, characterizing the first accent; and a shared term, characterizing at least the first accent.

Example 3 is the method of example(s) 1, wherein the first trained machine learning model is trained to support a plurality of accents, further comprising: receiving second information about a second accent, wherein the plurality of supported accents comprise the first accent and the second accent; applying the one or more adaptive weights to the first trained machine learning model, the one or more adaptive weights characterizing each of the plurality of supported accents, wherein: the one or more adaptive weights each include: a multiplicative term and a bias term, characterizing an accent from among the plurality of supported accents; and a shared term, characterizing the plurality of supported accents; and synthesizing, by the first trained machine learning model with the applied one or more adaptive weights, a second waveform representing the text input, wherein the second waveform is characterized by the second accent.

Example 4 is the method of example(s) 1, further comprising: for each character in the text input, converting the character to an embedded character representation; converting the first information about the first accent to an embedded accent representation; and for each embedded character representation, combining the embedded character representation with the embedded accent representation.

Example 5 is the method of example(s) 1, wherein the first trained machine learning model comprises a text encoder.

Example 6 is the method of example(s) 5, wherein the text encoder is a transformer neural network.

Example 7 is the method of example(s) 1, wherein the first trained machine learning model comprises a conditional variational autoencoder with normalizing flow.

Example 8 is the method of example(s) 7, wherein the first waveform is output by a vocoder.

Example 9 is the method of example(s) 8, wherein the vocoder is a second trained machine learning model, wherein the second trained machine learning model is a generative adversarial network.

Example 10 is a non-transitory computer-readable medium storing instructions that, when executed by one or more processors, cause the one or more processors to perform a method comprising: receiving a text input; receiving first information about a first accent; accessing a first trained machine learning model, the first trained machine learning model trained to synthesize, from inputted text, waveforms representing speech; applying one or more adaptive weights to the first trained machine learning model, the one or more adaptive weights characterizing the first accent; and synthesizing, by the first trained machine learning model with the applied one or more adaptive weights, a first waveform representing the text input, wherein the first waveform is characterized by the first accent.

Example 11 is the non-transitory computer-readable medium of example(s) 10, wherein the one or more adaptive weights each include: a multiplicative term and a bias term, characterizing the first accent; and a shared term, wherein the shared term characterizes a plurality of supported accents including the first accent.

Example 12 is the non-transitory computer-readable medium of example(s) 10, wherein the first trained machine learning model comprises a text encoder, wherein the text encoder is a transformer neural network comprising the adaptive weights.

Example 13 is the non-transitory computer-readable medium of example(s) 10, wherein: the first trained machine learning model comprises a conditional variational autoencoder with normalizing flow; and the first waveform is output by a vocoder, wherein the vocoder is a second trained machine learning model, wherein the second trained machine learning model is a generative adversarial network.

Example 14 is the non-transitory computer-readable medium of example(s) 13, wherein the conditional variational autoencoder with normalizing flow includes a posterior encoder and a flow-based invertible decoder.

Example 15 is a system comprising: a memory device; and one or more processors communicatively coupled to the memory device configured for: receiving a text input; receiving first information about a first accent; accessing a first trained machine learning model, the first trained machine learning model trained to synthesize, from inputted text, waveforms representing speech; applying one or more adaptive weights to the first trained machine learning model, the one or more adaptive weights characterizing the first accent; and synthesizing, by the first trained machine learning model with the applied one or more adaptive weights, a first waveform representing the text input, wherein the first waveform is characterized by the first accent.

The system of example(s) 15, wherein the one or more adaptive weights each include: a multiplicative term and a bias term, characterizing the first accent; and a shared term, characterizing at least the first accent, wherein the shared term is multiplied by the multiplicative term and the bias term is added to a product of the shared term and the multiplicative term.

The system of example(s) 15, wherein, the first trained machine learning model comprises a text encoder, wherein the text encoder is a transformer neural network comprising the adaptive weights, the transformer neural network comprising a plurality of transformer blocks.

The system of example(s) 15, wherein: the first trained machine learning model comprises a conditional variational autoencoder with normalizing flow; and the first waveform is output by a vocoder, wherein the vocoder is a second trained machine learning model, wherein the second trained machine learning model is a generative adversarial network.

The system of example(s) 18, wherein the conditional variational autoencoder with normalizing flow is trained using at least one of speaker embeddings, spectrograms, the text input, or information about the first accent.

The system of example(s) 19, wherein the first waveform is used to produce synthesized speech using an audio output device.

That which is claimed is:

1. A computer-implemented method, comprising:

receiving a text input;

receiving first information about a first accent;

accessing a first trained machine learning model, the first trained machine learning model trained to synthesize, from inputted text, waveforms representing speech;

applying one or more adaptive weights to the first trained machine learning model wherein the one or more adaptive weights directly influence each layer function in at least one transformer block of the first trained machine learning model, wherein:

the one or more adaptive weights are represented by a first matrix that is a combination of one or more matrices including at least one second matrix that characterizes the first accent or at least one third matrix that characterizes a plurality of accents including the first accent; and synthesizing, by the first trained machine learning model with the applied one or more adaptive weights, a first waveform representing the text input, wherein the first waveform is characterized by the first accent, wherein synthesizing the first waveform comprises:

predicting, by a text encoder of the first trained machine learning model, a conditional distribution;

sampling a latent variable from the conditional distribution; and transforming, by a decoder of the first trained machine learning model, the latent variable and a speaker embedding into a second latent variable.

2. The method of claim 1, wherein:

the first matrix comprises:

a multiplicative matrix and a bias matrix characterizing the first accent; and a shared matrix characterizing the plurality of accents including the first accent; and the first matrix is defined as the multiplicative matrix times the shared matrix plus the bias matrix.

3. The method of claim 1, wherein:

the first trained machine learning model is trained to support the plurality of accents;

the plurality of supported accents comprises the first accent and a second accent;

the one or more adaptive weights characterize each of the plurality of supported accents, wherein:

the one or more adaptive weights each include:

a multiplicative matrix and a bias matrix, characterizing an accent from among the plurality of supported accents; and a shared matrix, characterizing the plurality of supported accents; and the method further comprises:

receiving second information about the second accent; and synthesizing, by the first trained machine learning model with the applied one or more adaptive weights, a second waveform representing the text input, wherein the second waveform is characterized by the second accent.

4. The method of claim 1, further comprising:

for each character in the text input, converting the character to an embedded character representation;

converting the first information about the first accent to an embedded accent representation; and for each embedded character representation, combining the embedded character representation with the embedded accent representation.

5. The method of claim 1, wherein the text encoder is a transformer neural network.

6. The method of claim 1, wherein the first trained machine learning model comprises a conditional variational autoencoder with normalizing flow.

7. The method of claim 1, wherein synthesizing the first waveform further comprises:

generating, by a vocoder of the first trained machine learning model, the first waveform using the second latent variable.

8. The method of claim 1, wherein the synthesizing the first waveform further comprises:

aligning, by an alignment generation component of the first trained machine learning model, components of the text input with components of the first waveform to create a one-to-one correspondence.

9. The method of claim 1, wherein synthesizing the first waveform further comprises:

generating noise using a stochastic duration predictor;

sampling a duration using the noise; and sampling the speaker embedding using the noise.

10. The method of claim 9, wherein the synthesizing the first waveform further comprises:

applying the duration to provide human speech rhythms for the first waveform.

11. The method of claim 1, wherein the decoder is an inverted flow-based decoder.

12. A non-transitory computer-readable medium storing instructions that, when executed by one or more processors, cause the one or more processors to perform a method comprising:

receiving a text input;

receiving first information about a first accent;

accessing a first trained machine learning model, the first trained machine learning model trained to synthesize, from inputted text, waveforms representing speech;

applying one or more adaptive weights to the first trained machine learning model wherein the one or more adaptive weights directly influence each layer function in at least one transformer block of the first trained machine learning model, wherein:

the one or more adaptive weights are represented by a first matrix that is a combination of one or more matrices including at least one second matrix that characterizes the first accent or at least one third matrix that characterizes a plurality of accents including the first accent; and synthesizing, by the first trained machine learning model with the applied one or more adaptive weights, a first waveform representing the text input, wherein the first waveform is characterized by the first accent, wherein synthesizing the first waveform comprises:

predicting, by a text encoder of the first trained machine learning model, a conditional distribution;

sampling a latent variable from the conditional distribution; and transforming, by a decoder of the first trained machine learning model, the latent variable and a speaker embedding into a second latent variable.

13. The non-transitory computer-readable medium of claim 12, wherein:

the first matrix comprises:

a multiplicative matrix and a bias matrix, characterizing the first accent; and a shared matrix characterizing the plurality of accents including the first accent; and the first matrix is defined as the multiplicative matrix times the shared matrix plus the bias matrix.

14. The non-transitory computer-readable medium of claim 12, wherein:

the first trained machine learning model comprises a conditional variational autoencoder with normalizing flow; and the first waveform is output by a vocoder, wherein the vocoder is a second trained machine learning model, wherein the second trained machine learning model is a generative adversarial network.

15. The non-transitory computer-readable medium of claim 14, wherein the conditional variational autoencoder with normalizing flow includes a posterior encoder and a flow-based invertible decoder.

16. A system comprising:

a memory device; and one or more processors communicatively coupled to the memory device configured for:

receiving a text input;

receiving first information about a first accent;

accessing a first trained machine learning model, the first trained machine learning model trained to synthesize, from inputted text, waveforms representing speech;

applying one or more adaptive weights to the first trained machine learning model wherein the one or more adaptive weights directly influence each layer function in at least one transformer block of the first trained machine learning model, wherein:

the one or more adaptive weights are represented by a first matrix that is a combination of one or more matrices including at least one second matrix that characterizes the first accent or at least one third matrix that characterizes a plurality of accents including the first accent; and synthesizing, by the first trained machine learning model with the applied one or more adaptive weights, a first waveform representing the text input, wherein the first waveform is characterized by the first accent, wherein synthesizing the first waveform comprises:

predicting, by a text encoder of the first trained machine learning model, a conditional distribution;

sampling a latent variable from the conditional distribution; and transforming, by a decoder of the first trained machine learning model, the sampled latent variable and a speaker embedding into a second latent variable.

17. The system of claim 16, wherein:

the first matrix comprises:

a multiplicative matrix and a bias matrix, characterizing the first accent; and a shared matrix characterizing the plurality of accents including the first accent; and the first matrix is defined as the multiplicative matrix times the shared matrix plus the bias matrix.

18. The system of claim 16, wherein:

the first trained machine learning model comprises a conditional variational autoencoder with normalizing flow; and the first waveform is output by a vocoder, wherein the vocoder is a second trained machine learning model, wherein the second trained machine learning model is a generative adversarial network.

19. The system of claim 18, wherein the conditional variational autoencoder with normalizing flow is trained using at least one of speaker embeddings, spectrograms, the text input, or information about the first accent.

20. The system of claim 19, wherein the first waveform is used to produce synthesized speech using an audio output device.

* * * * *